United States Patent [19]

Singleton et al.

[11] Patent Number: 4,749,238
[45] Date of Patent: Jun. 7, 1988

[54] ELECTRONICALLY CONTROLLED FLUID PRESSURE BRAKING SYSTEM

[75] Inventors: William A. Singleton, Grafton; Merlyn L. Hutchins, Wellington; Jeffrey J. Krause, Concord Township; Lenora A. Bisacquino, Strongsville; Patrick J. Vandemotter, Westlake; Gary E. Budinger, North Olmsted, all of Ohio; Peter F. Gibbons; Glenn S. Bowker, both of Bristol, England

[73] Assignee: Allied Corporation, Morristown, N.J.

[21] Appl. No.: 37,497

[22] Filed: Apr. 13, 1987

[51] Int. Cl.$^4$ .............................................. B60T 13/68
[52] U.S. Cl. .......................................... 303/15; 303/7; 303/20
[58] Field of Search .................. 303/2, 7, 9, 15, 16, 303/20

[56] References Cited

U.S. PATENT DOCUMENTS 3,796,468 3/1974 Morse et al. ........................... 303/15
4,624,506 11/1986 Doto ......................................... 303/3

Primary Examiner—Duane A. Reger
Attorney, Agent, or Firm—Ken C. Decker; William N. Antonis

[57] ABSTRACT

An electronically controlled fluid pressure braking system for a heavy duty vehicle includes an operator controlled mechanism which generates independent brake pressure command signals, each of which are transmitted to separate auxiliary controllers. Each of the controllers transmits its command signal to the other auxiliary controllers and also to a master control unit. The master control unit sorts between the command signals and generates a preliminary brake pressure request signal which is transmitted back to each of the auxiliary controllers. Each of the auxiliary controllers then examines the brake pressure request signal received from the master controller and actuates the corresponding vehicle brakes if the pressure request signal is within normal limits. If the signal is not within normal limits, each of the auxiliary controllers is capable of generating a brake pressure request signal independently of the master control unit.

22 Claims, 7 Drawing Sheets

ELECTRONICALLY CONTROLLED FLUID PRESSURE BRAKING SYSTEM

This invention relates to an electronically controlled fluid pressure braking system for heavy duty vehicles.

Heavy duty vehicles, such as trucks and buses, are normally equipped with high pressure pneumatically operated brakes. It has been proposed to equip such vehicles with electronic controls to speed up brake actuation and release, as disclosed in U.S. Pat. No. 3,796,468. In general, such prior systems have proposed use of electronic controls only to speed up application and release of the vehicle brakes and have been proposed as an adjunct to, instead of a replacement for, the normal pneumatic actuation system. The present application discloses a braking system in which fluid pressure is controlled solely by electrical signals.

Accordingly, the present system has been designed with the necessary redundancies such that a single failure will not disable the system and deny braking. This has been done by using a master controller and by providing auxiliary controllers which communicate with the master controller. In tractor-trailer articulated vehicles, three separate auxiliary controllers are used. One auxiliary controller controls the front brakes of the tractor, a second auxiliary controller controls the rear brakes of the tractor, and a third auxiliary controller controls the trailer brakes. The first and second auxiliary controllers are equipped so that they may communicate with one another. Each of the first and second auxiliary controllers senses redundant signals generated by the vehicle operator when a brake application is effected. These signals are also sent to the master controller which calculates a preliminary brake request signal. This signal is examined by the auxiliary controllers and, if it is found to be within proper limits, the signal is used to effect a brake application. If the auxiliary controllers sense an improper request, the first and second auxiliary controllers are equipped to effect a tractor brake application without input from the master controller.

Accordingly, this invention has the advantage of providing electronic control of a vehicle braking system while providing the necessary redundancies required by regulations. These redundancies are provided using the minimum number of microprocessors, etc., with the minimum number of interconnections.

These and other features of the present invention will become apparent from the following description with reference to the accompanying drawings, in which.

Figure 2:
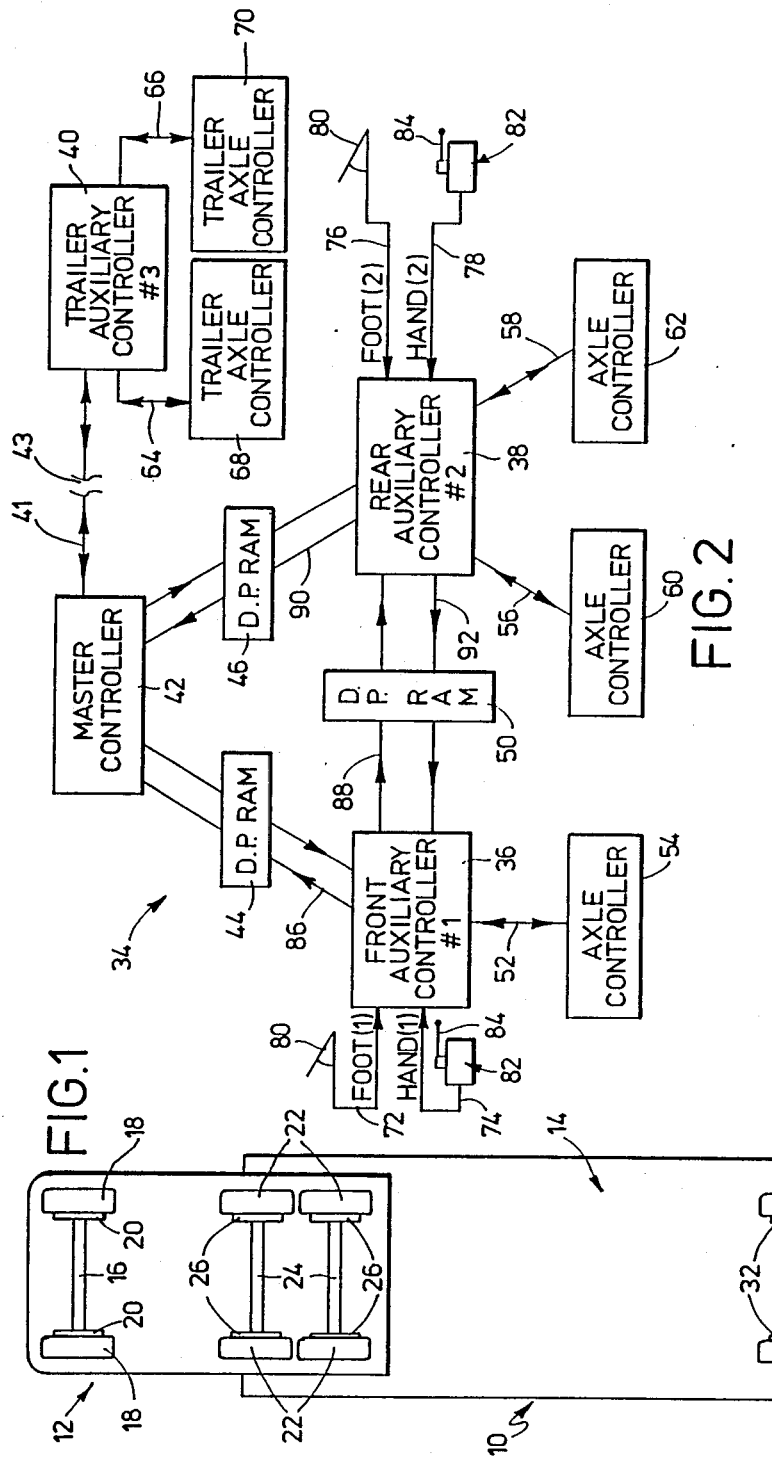
FIG. 2 is a diagrammatic illustration of the interrelationships between the various controllers used in the present invention.
Figure 8:
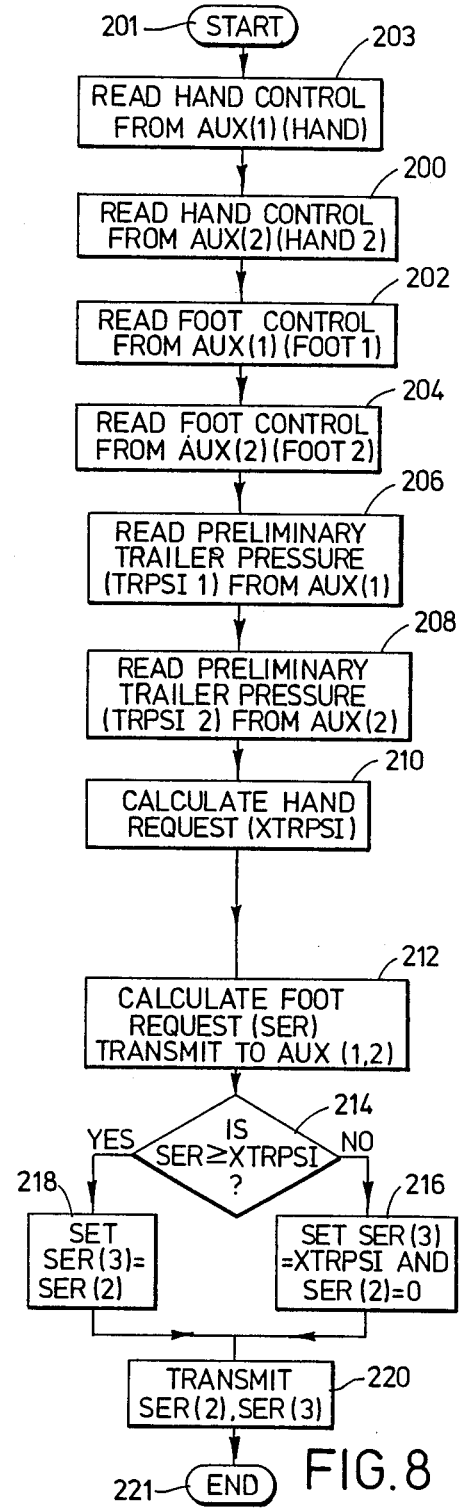
Figure 9:
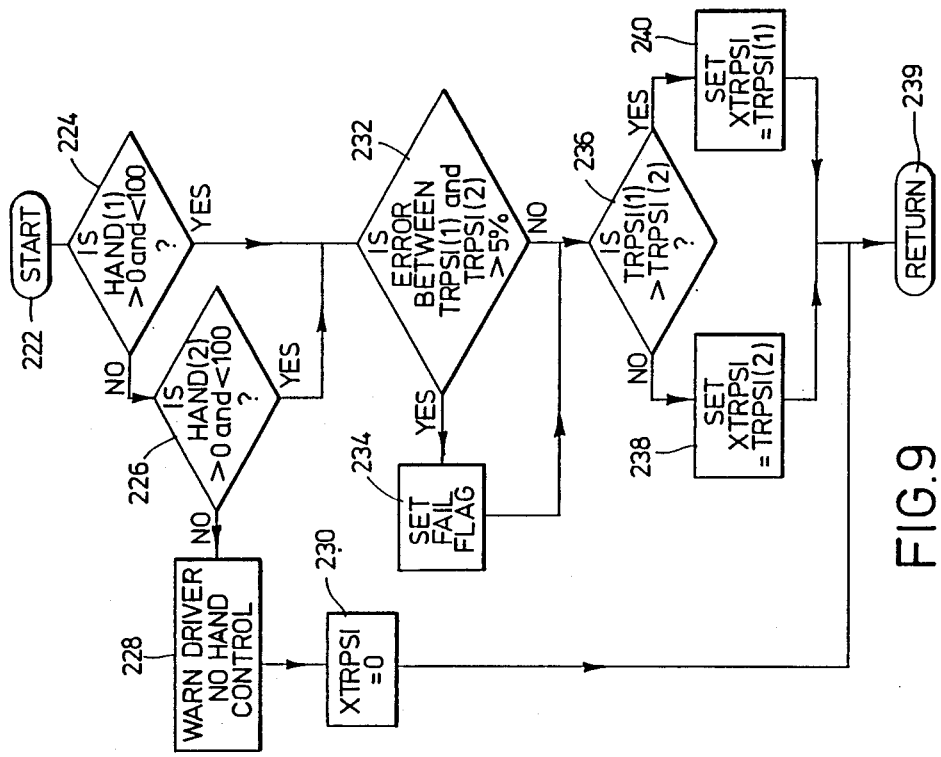
Figure 10:
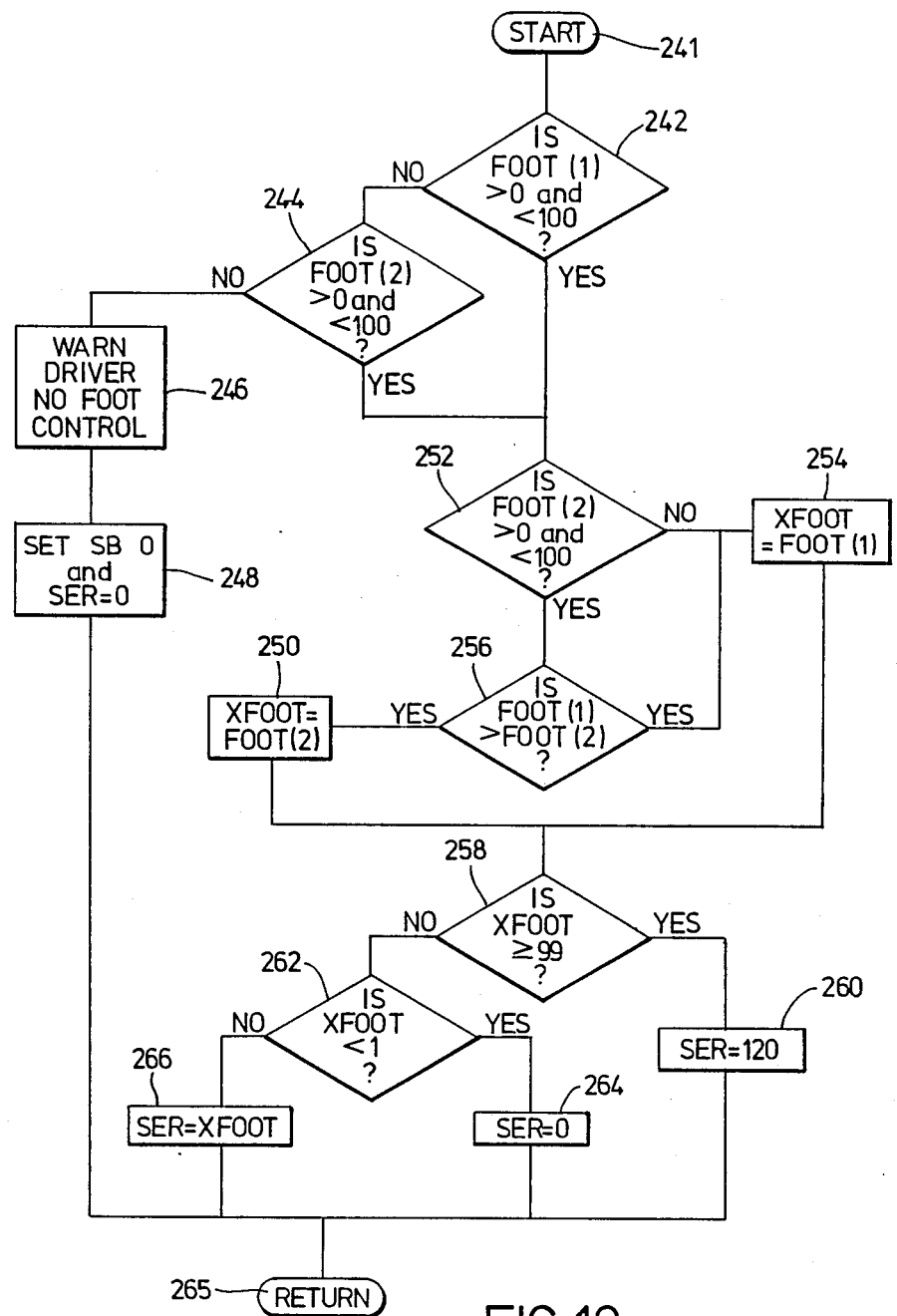
Figure 11:
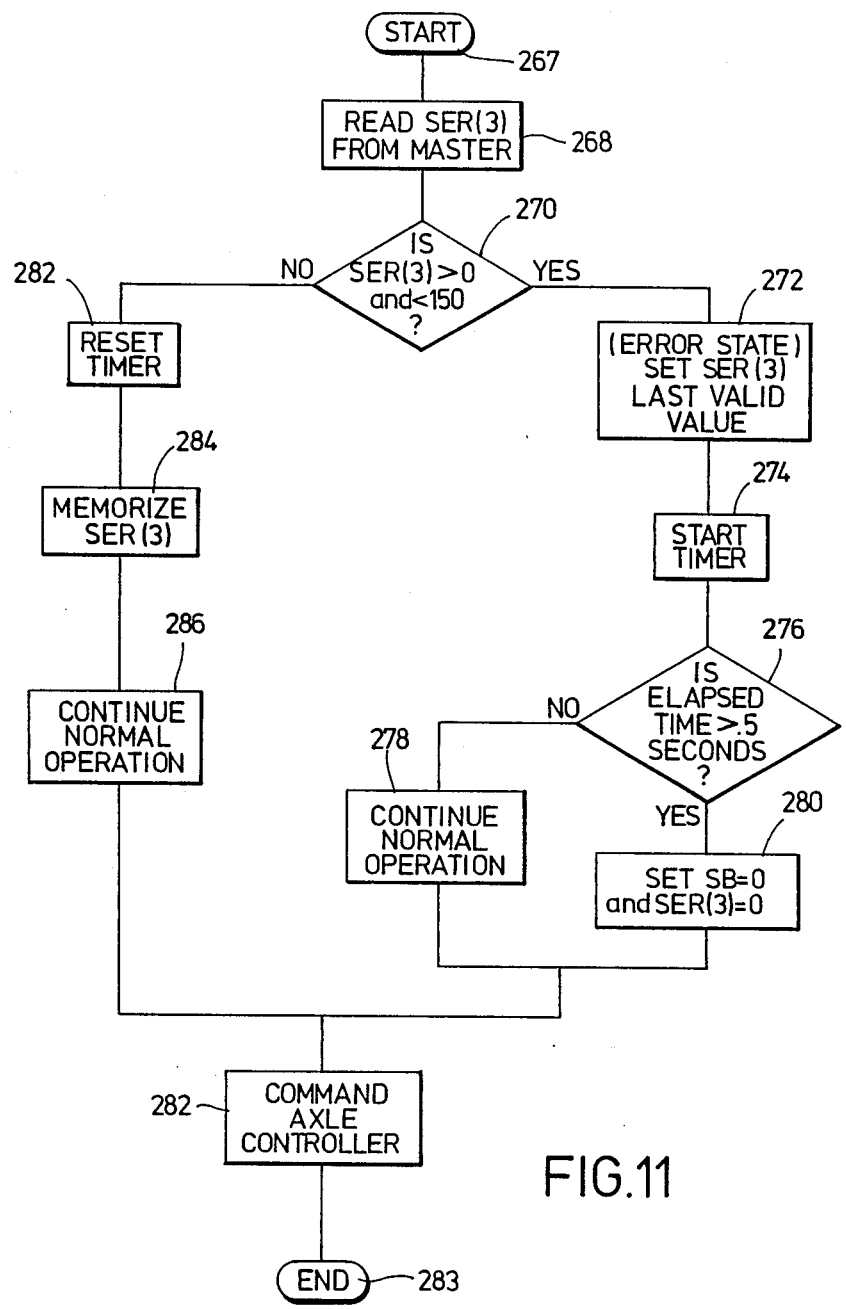

FIG. 3, FIG. 4, FIG. 5, FIG. 6, and FIG. 7 are detailed block system diagrams of the auxiliary controllers used on the tractor or towing unit of the vehicle equipped with a braking system made pursuant to the teaching of the present invention;

FIG. 8, FIG. 9, and FIG. 10 are detailed block system diagrams of the master controller illustrated in FIG. 2; and FIG. 11 is a detailed block system diagram of the auxiliary controller used on the towed units or trailer of an articulated vehicle equipped with the braking system made pursuant to the teachings of the present invention.

Figure 1:
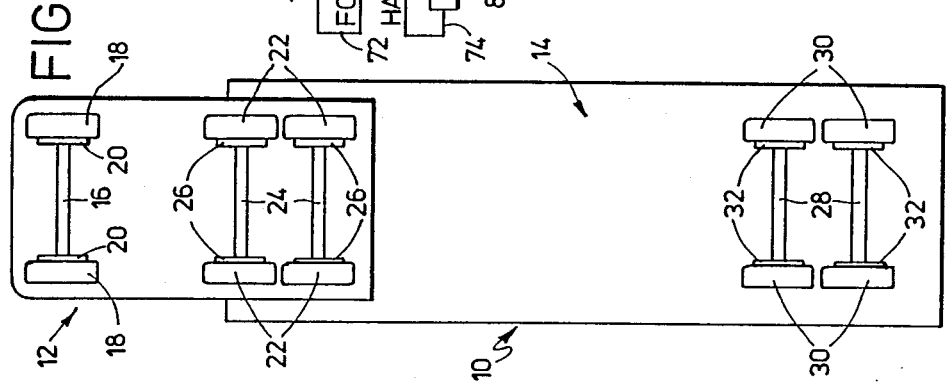
FIG. 1 is a diagrammatic illustration of the underside of the a tractor-trailer combination vehicle of the type to be equipped with the electropneumatic braking system pursuant to the teachings of the present invention.

Referring now to the drawings, the underside of a typical tractor-trailer articulated vehicle is indicated at 10 in FIG. 1. The vehicle 10 includes a tractor or towing portion generally indicated by the numeral 12 and a trailer or towed portion generally indicated by the numeral 14. The tractor 12 includes a front axle 16 upon which wheels 18 are rotatably mounted. Wheels 18 are controlled by fluid pressure actuated brakes 20. Rear wheels 22 of the tractor 12 are mounted on tandem rear axles 24 and are controlled by brakes 26. The trailer 14 is provided with tandem axles 28 which mount wheels 30. Wheels 30 are controlled by trailer brakes 32. As is conventional in the art, the brakes 20, 26, 32 are actuated by brake actuators (not shown), which are responsive to service braking pressure for effecting a service brake application. Actuators for brakes 26 and 32 are tandem actuators that also include a spring brake actuator which, in the absence of holdoff pressure, effects a spring powered actuation of the brakes. Reservoirs (not shown) are carried on both the tractor and the trailer and are charged by an automotive air compressor (not shown) which is operated by the vehicle engine on the tractor 12. In existing braking systems, fluid pressure communication between the reservoirs and both the service brake actuators and the spring brake actuators is controlled by a system of pneumatically operated valves controlled by the vehicle operator. The present invention relates to an electronic control system which electrically senses the vehicle operator commands, determines how much fluidic pressure to deliver to the brake actuators, electronically communicates the pressure request to the electrically actuated valving and performs closed loop control of the pressure delivered to the brake actuators of the various vehicle foundation brakes.

The control system for controlling the brakes 20, 26, and 32 electronically is generally indicated in FIG. 2 by the numeral 34. System 34 includes a front auxiliary controller 36 for the front axle 16 of the vehicle, a rear auxiliary controller 38 for the rear axles 24 of the tractor 12, and a trailer auxiliary controller 40 for the axles 28 of the trailer 14. The auxiliary controllers 36 and 38 each communicate with a master controller 42 through dual port random access memories ("RAM") 44 and 46. The trailer auxiliary controller 40 communicates with the master controller 42 through serial link 41 which extends between tractor 12 and trailer 14 through coupling 43. The controllers 36, 38 communicate with each other through a dual port RAM 50. Each of the controllers 36, 38, 40, and 42 includes a microprocessor programmed as will be hereinafter described. The front auxiliary controller 36 transmits a signal on output line 52 thereof indicating a desired brake pressure in the brakes on the front axle 16. This signal is transmitted to an axle controller 54, which includes electrically actuated valves and an appropriate electronic control for the electrically activated valves which are adapted, as is well known to those skilled in the art, to translate the signal transmitted on line 52 into a brake pressure level at the brakes 20. Similarly, the rear auxiliary controller 38 is adapted to generate similar signals on output lines 56, 58 thereof, which are similarly translated into a brake pressure level by axle controllers 60, 62, which are similar to controller 54 and which control brakes on the rear axles 24 of the tractor 12. The trailer auxiliary controller 40 also generates signals which are transmitted through output lines 64, 66 to corresponding axle controllers 68, 70, which are similar to controllers 54, 60, and 62 and which control fluid pressure level at the brakes 32 mounted on the axles 28 of the trailer 14.

Brake pressure command signals are transmitted to the front auxiliary controller 36 through input lines 72, 74 and to the rear auxiliary controller 38 through input lines 76, 78. The signals transmitted on lines 72 and 76 are generated by separate transducers responsive to movement of a single treadle member generally indicated by the numeral 80. Treadle member 80 may be similar to the one disclosed in U.S. Pat. No. 4,528,590, but modified to include a second movement-responsive transducer. Although there are two such treadle members 80 indicated schematically on the drawings for clarity, there is, in reality, only a single treadle member with two different transducers in order to generate independent signals that are transmitted through the lines 72, 76. The treadle 80 is mounted on the floor of the vehicle operator's compartment and is operated by the driver's foot in the same way a conventional brake pedal is operated.

The signals on lines 74, 78 are generated from separate transducers within a hand control actuating device generally indicated by the numeral 82. Again, while two different devices 82 are illustrated in FIG. 2 for illustrative purposes, in reality only a single device 82 would be mounted in the vehicle operator's compartment, where the handle 84 thereof can be reached by the vehicle operator. The device 82 includes separate pressure transducers which convert the degree of angular movement of the lever 84 into an electrical signal. The output of each of the transducers included within the device 82 are transmitted over lines 74, 78 to the controllers 36, 38 respectively. The lever 84 is operated by the vehicle operator to control the brakes of the trailer 14 independently of the brakes on the tractor. Accordingly, a brake application of all of the vehicle's brakes can be effected by actuating the treadle 80 or a trailer brake application alone may be effected by operation of the lever 84. The signals generated on the lines 72, 74 are transmitted to the dual port RAMS 44, 50 through output lines 86, 88 respectively. Similarly, signals on input lines 76, 78 are communicated to the dual port RAMS 46, 50 through output lines 90, 92. Accordingly, the signals from both transducers on both of the devices 80 and 82 (a total of four separate signals) are made available to each of the controllers 36, 38 and 42.

Referring now to FIGS. 3-7 the manner in which each of the auxiliary controllers 36, 38 processes the data transmitted to it will be described in detail. In the flow charts comprising FIGS. 3-7, a form of matrix notation has been used. The term AUX (1,2) refers to either of the aforementioned auxiliary controllers 36 or 38. The values of the corresponding variables are similarly noted; for example, the variable HAND (1, 2) means that it is either the input from the first transducer on the hand controller or the second transducer on the hand controller, depending upon which of the auxiliary controllers is being referred to.

Accordingly, when the system is started as at 92, the inputs from the hand control (either the first or second transducer of the hand control depending upon which of the controllers 36, 38 is referred to) and similar inputs from the foot control are read. These inputs are converted from analog to digital signals, all as indicated in block 94 of FIG. 3. As indicated in block 96, the readings of the hand and foot controls are transmitted to the other auxiliary controller 36 or 38 and to the master controller 42 by placing the data in the dual port RAMS 44, 46 and 50. As indicated at 98, the readings for the hand and foot inputs are converted to a percentage of full range. These inputs are identified by the variable H% for the hand control, and F% for the foot control. If either of the H% or F% variables are out of range, they are both arbitrarily set at 150%.

The inputs from the other auxiliary controller, which are stored in the dual port RAM 50, are then read, as set forth in block 100. These have already been converted to percentages in the other auxiliary controller. The variable representing the hand control value from the other controller is identified by the variable AUXH%, and the variable representing the value of the foot control signal from the other controller is identified by the variable AUXF%.

Figure 4:
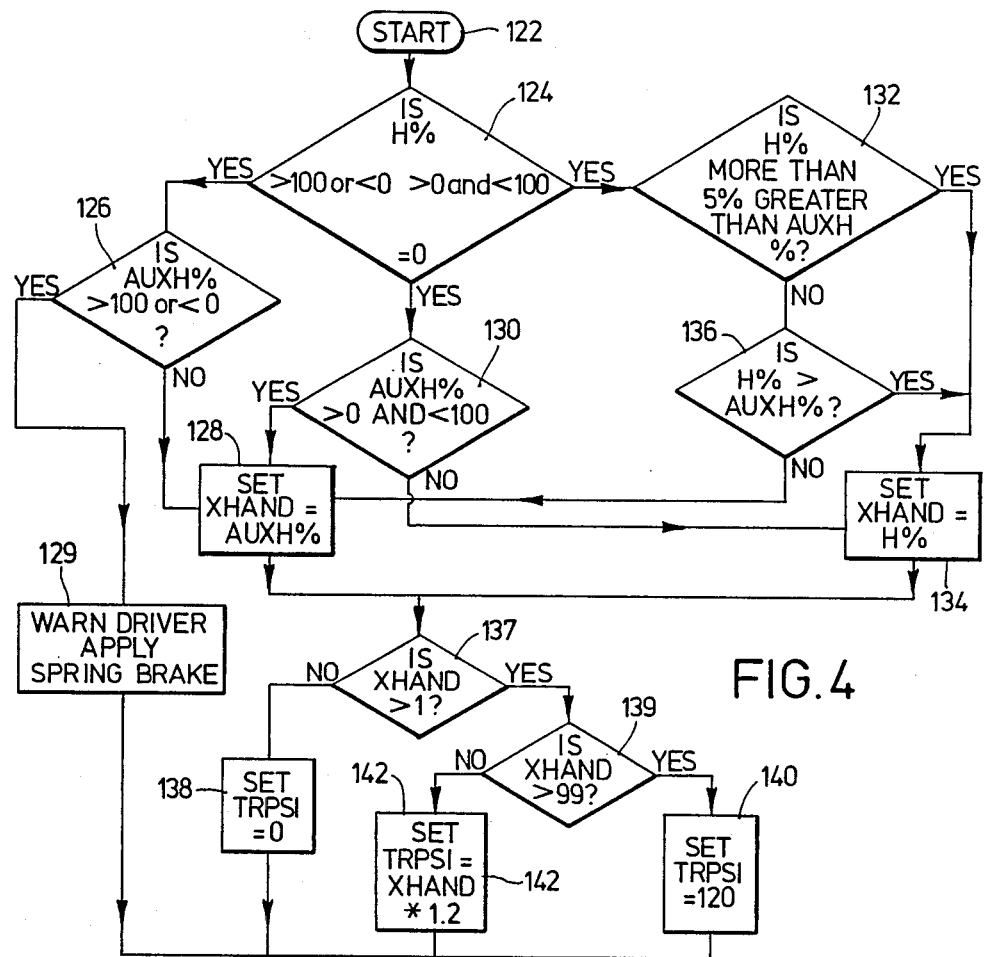
Figure 6:
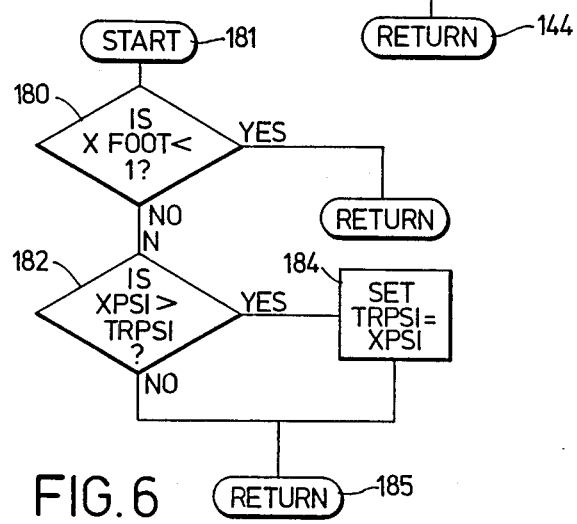

The program then proceeds to block 102, where it calculates the hand request signal as more completely illustrated in FIG. 4. As indicated in 104, the program then calculates the foot request signal, as will be more fully described with reference to FIG. 5. As indicated at 106, the program then selects between the foot and hand request for use in setting the trailer brakes, as more completely illustrated in FIG. 6. The request for the magnitude of a trailer application is identified by the variable TRPSI. The program, as indicated at 108 then transmits the value for the trailer brake application (TRPSI) to the master controller through the dual port RAM 44 or 46. As described in detail hereinafter, the master controller examines the value of TRPSI transmitted from both of the auxiliary controllers, and selects an appropriate value for transmission to the trailer auxiliary controller 40 for use in applying the trailer brakes.

The program then reads a preliminary service brake request from the master controller 42 as indicated at 110, performs a failure analysis on both the data from the master controller and the preliminary foot request data calculated by the subroutine indicated at 112, and at 116 chooses between the master and auxiliary request for control. The program, as indicated at 118, then transmits the brake pressure request signal to the axle controllers, controlled by a corresponding auxiliary controller, which effects a brake application of a magnitude indicated by the request signal. The program then ends, but the program illustrated in FIG. 3 cycles each time the microprocessor within the auxiliary controller cycles.

Referring to FIG. 4, the subroutine for calculating the hand control request is started as indicated at 122. The program then proceeds to decision block 124, which examines the variable H%. If H% is either greater than 100 or less than 0, which indicates a failed condition, the program branches to decision block 126, which examines AUXH%, the hand control command from the other auxiliary controller. If both H% and AUXH% are either greater than 100 or less than 0, a failed condition is indicated by warning the driver and applying the spring brakes as indicated at block 128. If, however, the variable AUXH% is within proper limits, the program proceeds to block 128, which sets the hand request, identified by the variable XHAND, equal to the variable AUXH% which was received from the other auxiliary controller.

Referring back to decision block 124, if the variable H% is equal to 0, the program proceeds to decision block 130, if AUXH% is within range, that is, if it is greater than 0% and less than 100%, the program branches back to the block 128, which sets XHAND, the hand request, equal to AUXH%, the brake pressure percentage command signal from the other auxiliary controller.

If the value of H% is within range, that is, if it is greater than 0 and less than 100, the program branches to decision block 132, which determines if the difference between H% and AUXH% is less than a 5% difference. If H% is more than 5% greater than AUXH%, XHAND is set equal to H% as indicated by block 134. If H% is not more than 5% greater than AUXH%, the program proceeds to block 136, which determines if H% is greater than AUXH%, and then branches either to block 128 or 134, which sets XHAND, the hand control command variable, equal to the greater of H% or AUXH%.

The program then examines, in decision block 137, as to whether or not the variable XHAND is greater than 1. If the variable XHAND is less than 1, the program assumes that the brakes are to be released, and sets the trailer brake pressure request TRPSI equal to 0 pursuant to block 138. If, however, the variable XHAND is greater than 1, the program branches to block 139, which examines if the variable XHAND is greater than 99, representing a full-on brake application. If the variable XHAND is greater than 99, the value of the trailer brake pressure is set at 120, pursuant to block 140. Accordingly, a brake message level of 120 psi is requested, which is substantially the maximum pressure available in the braking system. If XHAND is less than 99, the value of the trailer brake application is set at 1.2 times the value of the XHAND signal as indicated at block 142. The program then returns to the main program as indicated at 144.

Figure 3:
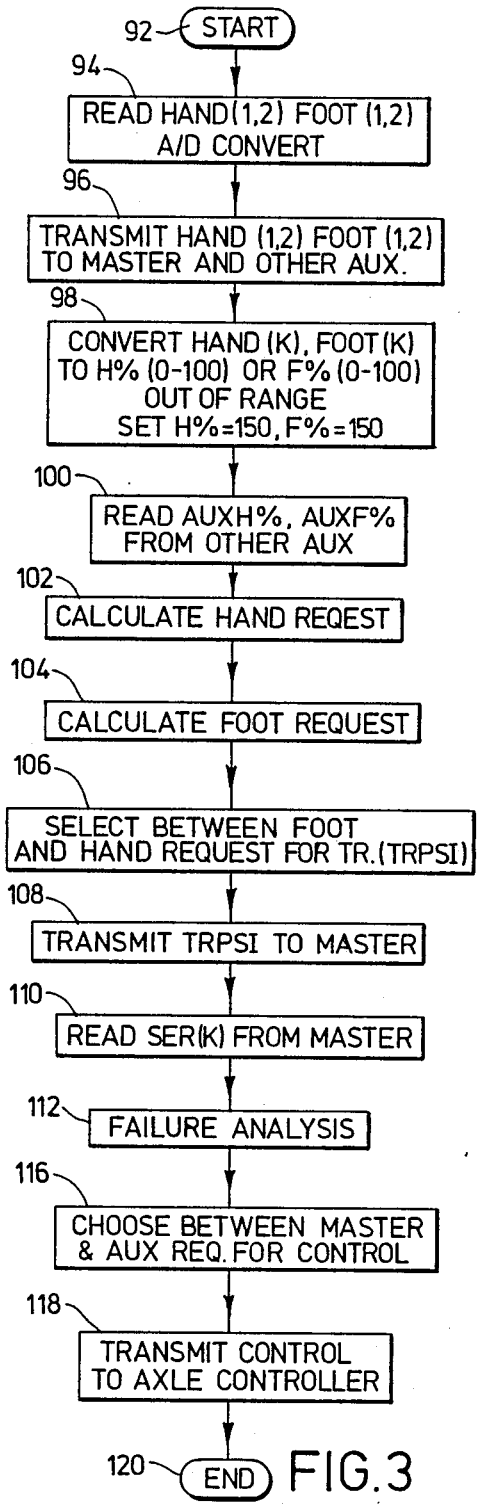
Figure 5:
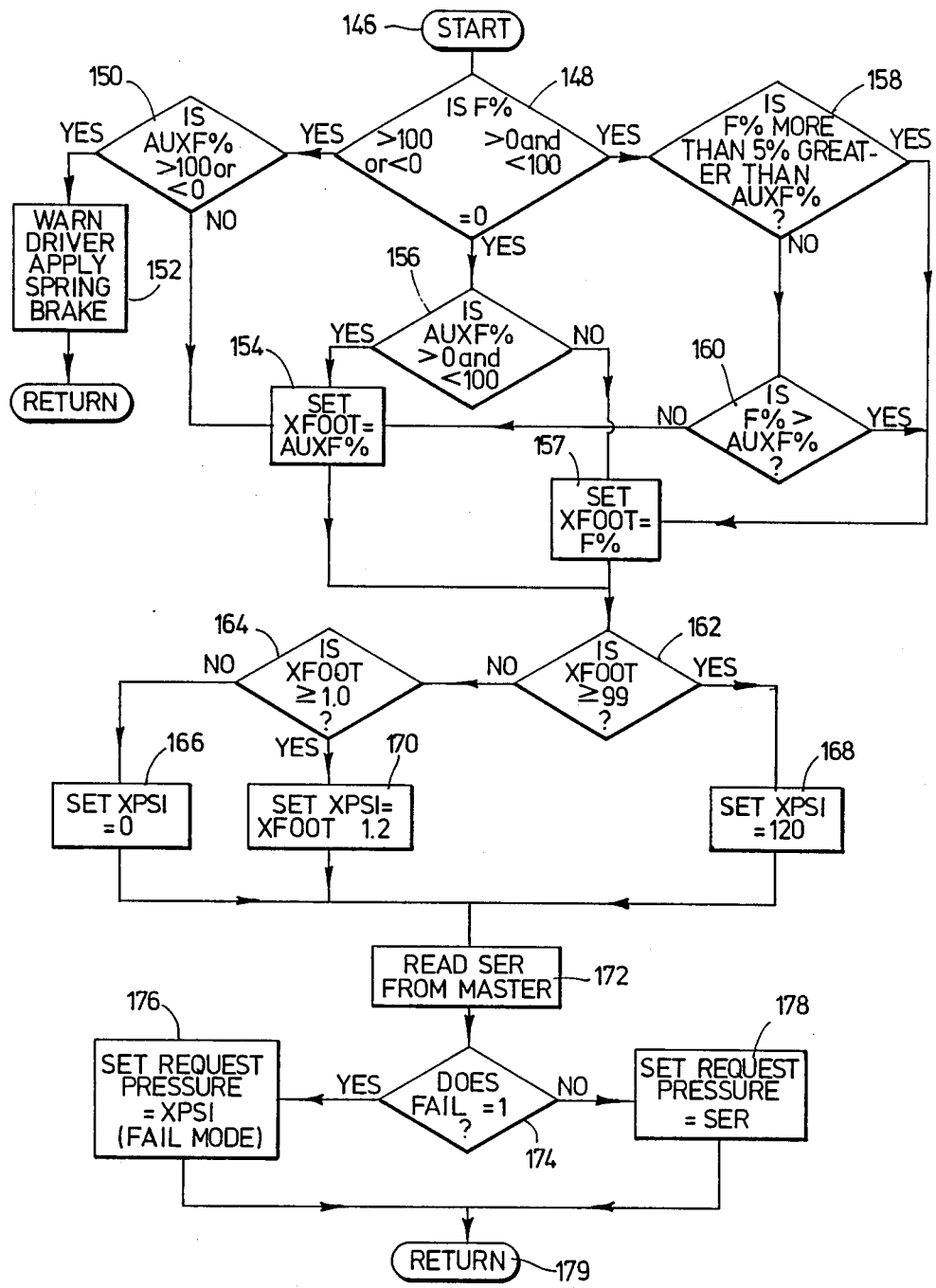

Referring to the subroutine for calculating the foot request signal indicated by block 104 in FIG. 3, reference is made to FIG. 5 in which the subroutine is started at 146. The program then examines the F% signal in block 148. If the F% signal is out of range, the program branches to decision block 150. Decision block 150 examines the variable AUXF%, which is the output of the transducer read by the other auxiliary controller. If both F% and AUXF% are out of range, a failed condition is indicated, the driver is warned and the spring brakes are applied as indicated at 152. If AUXF% is within range, the value of the foot control variable XFOOT is set equal to AUXF%, as indicated by block 154.

If in decision block 148, the value of F% is determined to be equal to 0, the program branches to decision block 156. If AUXF% is greater than 0 and less than 100, the value of the XFOOT variable is set equal to AUXF%, as indicated in block 154. If AUXF% is out of range, the XFOOT variable is set equal to F% pursuant to block 156 which, in this case, would be set equal to 0.

If the value of F% is within range, the program branches to decision block 158, which determines if F% is more than 5% greater than AUXF%. If F% is more than 5% greater than AUXF%, the program sets the XFOOT variable equal to F%, as indicated by the block 157. If F% is not more than 5% greater than AUXF%, it is then determined at 160 whether or not F% is greater than AUXF%. If F% is greater than AUXF%, the XFOOT variable is set equal to F%; if AUXF% is greater than F%, the XFOOT variable is set equal to AUXF%.

The value of XFOOT is then examined, in decision blocks 162 and 164, as to whether it is either less than 1 or greater than 99. If XFOOT is less than 1, it is assumed that a 0 brake pressure level is being requested. The value of XPSI, the preliminary brake pressure request signal representing a commanded brake pressure level in psi, is accordingly set at 0 as indicated at 166, If the value of XFOOT is greater than 99, the value of XPSI is arbitrarily set at 120, which represents a brake pressure level of 120 psi, the maximum pressure which the system is capable of generating, as indicated at 168. If the value of XFOOT is between 1 and 99, the value of XPSI is set equal to XFOOT times 1.2, as indicated in block 170.

Figure 7:
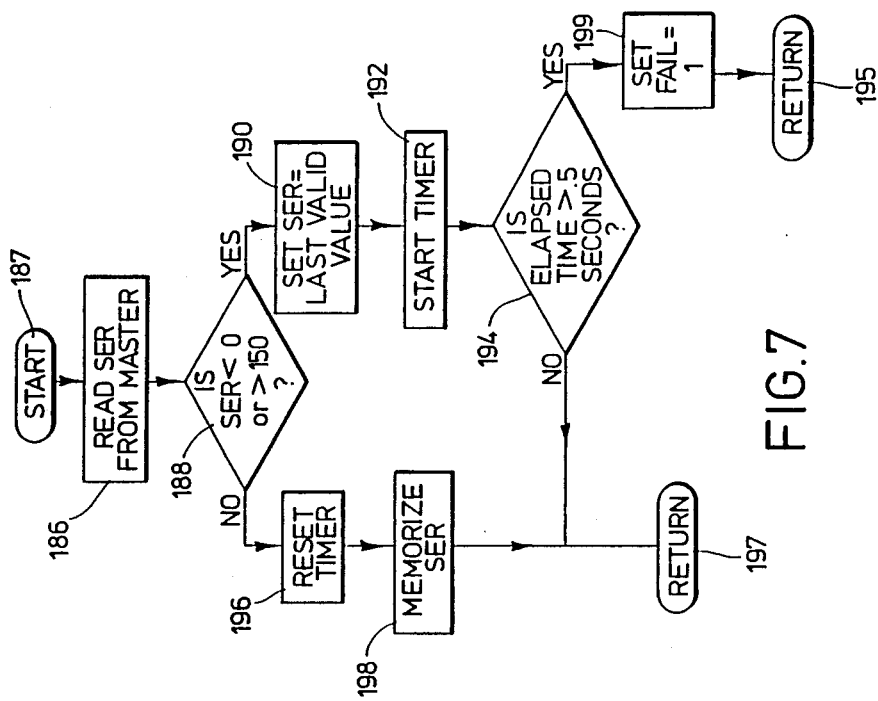

The service brake pressure command generated in the master controller 42, indicated by the variable SER at 172 of FIG. 5, is then read. This service brake pressure request has been calculated by the master controller using the same data that is available to the auxiliary controllers 36, 38 as described as hereinabove. The program then examines, at 174, as to whether the failure flag had been set in the failure analysis performed as indicated in FIG. 7, which will be described hereinafter. If the failure flag has been set, indicating a failure mode, the program sets the requested service brake pressure equal to XPSI, as indicated at 176. If the failure flag has not been set, the requested service brake pressure is set equal to SER, as indicated at 178, which is the service pressure request calculated from the master controller. The program then returns at 179 to the main program, wherein, as indicated at 118, the requested service pressure is transmitted to the axle controllers for actuation of the corresponding service brakes.

It will be recalled that a requested trailer brake pressure signal TRPSI was calculated from the data received from the hand control mechanism 82 in the subroutine illustrated in FIG. 4. Reference is now made to the subroutine illustrated in FIG. 6 which, pursuant to block 106 in the main program illustrated in FIG. 3, decides whether to use the hand control signal or the foot control signal to control the trailer brakes. Accordingly, the subroutine is started at 181, and the value of XFOOT is examined at decision block 180 to determine if it is less than 1. If the value of XFOOT is less than 1, it is assumed that the driver is not actuating the treadle 80. The program then merely returns to the main program, since the value of TRPSI is already been calculated by the hand control. Accordingly, the driver has actuated the hand control alone, and this value of TRPSI is used to actuate the trailer brakes, as will be hereinafter described with reference to the operation of the master controller 42. If however, the value of XFOOT is not less than 1, the value of XPSI is examined to see if it is greater than or less than the value TRPSI as calculated from the hand control request in FIG. 4, pursuant to decision block 182. If TRPSI is greater than XPSI, the subroutine merely returns to the main program, since TRPSI has already been calculated at the higher value pursuant to the hand control request calculations made in FIG. 4. If, however, the value of XPSI, which is calculated from the foot command signal is greater than TRPSI, the value of TRPSI, as indicated at 184, is set equal to the value of XPSI which has been calculated from the foot control request. The subroutine then returns as indicated at 185 to the main program illustrated in FIG. 3, wherein the value of TRPSI is transmitted to the master controller pursuant to block 108.

FIG. 7 illustrates diagrammatically the failure analysis performed in the auxiliary controller pursuant to block 112 of the main program illustrated in FIG. 3. The subroutine illustrated in FIG. 7 sets the failure flag used in decision block 174 of the subroutine illustrated in FIG. 5 to determine if a failed condition exists and decides if the service brake pressure calculated in the master controller should be used as opposed to the brake pressure calculated in the corresponding auxiliary controller. As indicated in FIG. 7, the value of SER, which represents the service brake pressure request calculated in the master controller in a manner to be hereinafter described, is read pursuant to 186 after the subroutine is started at 187. The value of SER is then examined in decision block 188 to determine if it is either less than 0 or greater than 150. If the value of SER is greater than 150 or less than 0, indicating an out of range condition, the value of SER is set equal to a memorized value as will be hereinafter described as indicated at 190. As the same time, a timer is started as indicated at 192. If the elapsed time, as determined in decision block 194, since the last time that a valid value of SER was received exceeds 0.5 second, a failure flag is set (FAIL=1) as indicated at 199 and returns the main program as indicated at 195. This failure flag is used in decision block 174 of the subroutine illustrated in FIG. 5 for use in selecting between the pressure request calculated in the master controller or the auxiliary controller for control of the service brakes. If, however, the value of SER is within range, the timer is reset as indicated at 196. At the same time, the value of SER is memorized at 198, for use at block 190 in case an out of range condition of the value of SER is measured. The subroutine then returns as indicated at 197 to the main program illustrated in FIG. 3. Referring now to FIGS. 8, 9, and 10, operation of the master controller 42 will now be described in detail. Referring to FIG. 8, the program is started at 201 and, as indicated at 203, the value of the hand control input (HAND 1) is read from the corresponding dual port RAM 44 calculated by the first auxiliary controller (AUX1), which is arbitrarily selected to be the auxiliary controller 36. Similarly, as indicated at 200, the value of the hand control input (HAND 2) is read from the other auxiliary controller. As indicated at 202 and 204, similar readings are made of the value of the foot control input. As indicated at 206 and 208, the values of the trailer pressure command from each of the auxiliary controllers (TRPSI1 and TRPSI2) are read. These values are then used to calculate a hand request signal, identified by the variable XTRPSI, pursuant to the subroutine illustrated in FIG. 9 to be described in detail hereinafter. Calculation of the hand request is indicated at 210 in FIG. 8. Similarly, a foot request indicated by the variable SER is calculated as indicated at 212. This foot request value is transmitted back to the auxiliary controllers 36, 38 through the corresponding dual port RAMS and is utilized by the auxiliary controllers as described hereinabove.

The value of the foot request SER is then examined in decision block 214 to determine if it is greater than or less than the value of the hand request XTRPSI. If the value of SER is greater than XTRPSI, the service signal SER transmitted to the trailer auxiliary controller 40, indicated by the variable SER (3) is transmitted to the trailer auxiliary controller 40. If the value of XTRPSI however is greater than SER, the value of SER (3), that is, the service brake pressure transmitted to the trailer auxiliary controller, is set equal to the value XTRPSI pursuant to block 216 and then transmitted to the trailer pursuant to block 218. The master controller then transmits the spring brake information to all the auxiliary controllers 36, 38, and 40 as indicated by the block 220. This information is determined by the portion of a dash switch on the vehicle. The program then ends, as indicated at 221.

The manner in which the hand control trailer brake request is calculated, pursuant to 210 in FIG. 8, is illustrated in FIG. 9, the subroutine is started pursuant to 222 and the program then proceeds to decision block 224 which determines if the signal representing the input of the hand controller 82 from auxiliary controller 36 (that is, auxiliary controller #1) is within the normal limits of being greater than 0 and less than 100. If the request from the first auxiliary controller is not within the normal limits, the hand request from the other auxiliary controller is checked to determine if it is within normal limits pursuant to decision block 226. If neither of the hand control values are within normal limits, the driver is warned that there is no hand control, pursuant to block 228, whereupon the value of XTRPSI is set equal to 0 pursuant to block 230.

If both of the readings from the hand controls are within the normal limits, the programs proceeds to decision block 232, which determines if there is more than a 5% difference in the values of TRPSI calculated in the first and second auxiliary controllers 36, 38. If there is a 5% difference or more, a failure flag is set at 234, which will inform the technician servicing the system that at some point during the operation of the system the values of TRPSI differed by more than 5%. The program then selects, pursuant to decision block 236 and blocks 238, 240, the higher of TRPSI1 or TRPSI2, and sets XTRPSI as the higher of these values. The subroutine then returns to the main program as indicated at 239.

The manner in which the brake pressure command signal based upon the foot control input is generated by the master controller 42 is illustrated in FIG. 10. Referring to FIG. 10, the subroutine is started as indicated at 241 decision block 242 checks the input from the treadle 80 transmitted by the first auxiliary controller 36 is checked to see if it is within the normal limits of being greater than 0 and less than 100. If it is not, the program branches to decision block 244, where the corresponding foot input transmitted through the other auxiliary controller 38 is checked to see if it is within the normal limits. If neither of the foot inputs is within the normal limits, the driver is warned as at 246 that there is no foot control, the service brake pressure is set equal to 0, and the spring brakes are applied pursuant to block 248. If the input FOOT1 is not within normal limits but the input from FOOT2 is within normal limits, the work variable XFOOT is set equal to FOOT2, as indicated at 250.

If FOOT1 is within normal limits, the program branches to decision block 252, which tests to determine if FOOT2 is within normal limits. If FOOT2 is not within normal limits but FOOT1 is within normal limits, the work variable XFOOT is set equal to FOOT1 as indicated at 254. If both FOOT1 and FOOT2 are within normal limits, the values of FOOT1 and FOOT2 are checked in decision block 256. If FOOT1 is greater than FOOT2, XFOOT is equal to FOOT1, but if FOOT2 is greater than FOOT1, XFOOT is equal to FOOT2.

In decision block 258, the value of XFOOT as determined from block 250 or 254 is checked to determine if it is greater than or less than 99. If the value of XFOOT is greater than 99, the service brake pressure request SER calculated by the master controller is set equal to 120, pursuant to block 260. This corresponds to the maximum brake pressure that the system is capable of generating. If XFOOT is less than 99, the value of XFOOT is tested at decision block 262 to determine if it is less than 1. If the value of XFOOT is less than 1, it is assumed that the brakes are to be released and, accordingly, the value of SER is set equal to 0 as indicated at 264. If XFOOT is greater than 1 but less than 99, the value of SER is equal to XFOOT, as at block 266. The subroutine then returns to the main program of FIG. 8, as indicated at 265. As indicated in FIG. 8, the service brake request SER calculated by the master controller is transmitted through the corresponding dual port RAMS to auxiliary controllers 36 and 38 pursuant to block 212 of FIG. 8. However, the service request SER3 to be transmitted to the trailer auxiliary controller AUX3 is selected to be equal either to SER or to XTRPSI as determined in blocks 214, 215, and 218 of FIG. 8.

Referring now to FIG. 11, the control sequence for the trailer auxiliary controller AUX3 is illustrated. The program is started at 267, and output SER(3), (the trailer service brake request calculated by the master controller pursuant to FIG. 8) is read as indicated by block 268. This variable is tested to determine if it is between the normal limits of being greater than 0 and less than 150 as indicated in decision block 270. If the values as determined by decision block 270 are not within normal limits, an error state is declared as set forth in block 272 and the value of SER (3) is set equal to the last valid value that has been memorized as will be described hereinafter. A timer is started as indicated in block 274. If the elapsed time since a valid value of SER (3) has been received is less than 0.5 second, as determined by decision block 276, normal operation is continued pursuant to block 278. If, however, the elapsed time is greater than 0.5 second, the value of SER (3) is set equal to 0 and the spring brakes (SB) are applied to effect a spring application of the vehicle's brakes as indicated at 280. In any event, the auxiliary controller for the trailer commands the axle controllers pursuant to block 282, as described hereand- before with respect to the auxiliary controllers 36 and 38.

If the value of SER (3), as checked by decision block 270, is within normal limits, the timer started at block 274 is reset as at 282, and the value of SER (3) is memorized as at 284, for use in block 272 in case a failure occurs during the next operation of the program. The program then continues normal operation pursuant to block 286, and then commands the axle controller as set forth in 282. The program then ends, as indicated at 283.

In operation, both the front and rear auxiliary controllers 36, 38 read the inputs from separate transducers on the foot control treadle 80 and the hand control device 82. Each of the auxiliary controllers 36, 38 transmit the corresponding value of the signal transmitted by the corresponding transducer of the foot treadle 80 and the hand control device 82 to the other auxiliary controller through the dual port RAM 50. Each of the auxiliary controllers calculates a preliminary trailer brake request (TRPSI) using values sensed by the auxiliary controller in which the calculation is being performed or transmitted to the auxiliary controller in which the calculations is being performed by the other auxiliary controller. Accordingly, each of the auxiliary controllers transmits a value of the command signal from the foot treadle 80, a value from the hand control device 82, and the preliminary trailer brake pressure TRPSI to the master controller. The master controller performs failure checks on the data received from the auxiliary controllers 36, and 38, and uses data received from both auxiliary controllers in order to calculate a service brake request signal SER. This service brake request signal SER is transmitted directly to the auxiliary controllers 36, 38. Each of the auxiliary controllers 36, 38 performs failure checks on the value of the SER signal received from the master controller. If the value received from the master controller is in error, each of the auxiliary controllers selects a service brake request signal calculated within the auxiliary controller to effect a brake application through the axle controllers 54, 60, or 62.

The master control also checks the values from the hand control device 82 as transmitted by both the auxiliary controllers 36 and 38. If these values are found to be proper, the master controller then checks the preliminary values of the trailer brake request from the hand control devices calculated by the auxiliary controllers 36 and 38. If both of these requests are within proper bounds, the higher one is selected. The master controller then checks the value of the selected trailer brake pressure level from the hand control device (TRPSI) and compares it with the value of the service request signal (SER) calculated from the input from the foot treadle 80. If both of these values are within proper limits, the master controller selects the higher of the SER signal or the XTRPSI signal, and transmits this latter value as service brake request signal to the trailer auxiliary controller 40. The trailer auxiliary examines the signal from the master controller and, if it is a proper signal, actuates the trailer brakes through the trailer axle controllers 68, 70. If the trailer service brake signal SER(3) from the master controller 42 is determined by the trailer controller 40 to be outside of normal limits, a failed condition is declared and the trailer spring brakes are set.

Accordingly, the foregoing system provides the double redundancy required by industry standards and governmental regulations such that a single failure will not normally disable the braking system. This redundancy is effected through the use of the minimum number of discreet components and a minimum number of interconnections, thereby providing a cost effective system to provide electronic control of the vehicle brakes.

We claim:

1. Electronically controlled fluid pressure braking system comprising operator responsive means for generating a pair of command signals representing an operator commanded braking level, auxiliary controller means for receiving each of said command signals and for generating a first pressure request signal, master controller means for receiving said command signals and for generating a second pressure request signal, said auxiliary controller means including means for receiving said second pressure request signal from the master controller means and for selecting between said first and second pressure request signals, and means for controlling braking pressure in said braking system in response to the selected signal.

2. Electronically controlled fluid pressure braking system as claimed in claim 1 wherein said auxiliary controller means includes a first auxiliary controller for receiving one of said command signals and a second auxiliary controller for receiving the other command signal, each of said auxiliary controllers including means for receiving from the other auxiliary controller the command signal received by said other auxiliary controller.

3. Electronically controlled fluid pressure braking system as claimed in claim 2 wherein each of said auxiliary controllers includes means for transmitting the corresponding command signal to said master controller means.

4. Electronically controlled fluid pressure braking system as claimed in claim 3 wherein said master controller means includes means for checking said command signals to determine if said command signals fall within predetermined limits, means for warning the driver if neither of the command signals fall between said predetermined limits, and means for selecting one of the command signals as said second pressure request signal if both of the command signals fall within the predetermined limits.

5. Electronically controlled fluid pressure braking system as claimed in claim 4, wherein said master controller means includes means for setting said second pressure request signal equal to 0 if the selected command signal is below a predetermined level and for setting said second pressure request signal equal to a predetermined high value if the selected command signal is above a predetermined value.

6. Electronically controlled fluid pressure braking system as claimed in claim 2, wherein each of said auxiliary controllers includes means for determining if each of the command signals falls between predetermined limits and for warning the vehicle operator if neither of the signals falls between predetermined limits, and means for selecting one of said signals if both of the signals fall between predetermined limits.

7. Electronically controlled fluid pressure braking system as claimed in claim 2, wherein said operator response means is operated by the foot of said operator and includes means for simultaneously generating said command signals as a function of the operation of said operator response means, each of said command signals being transmitted only to a corresponding one of said auxiliary controllers.

8. Electronically controlled fluid pressure braking system as claimed in claim 2, wherein said operator responsive means includes a hand control actuator which generates said pair of signals in response to movement of a control lever.

9. Electronically controlled fluid pressure braking system as claimed in claim 2, wherein said fluid pressure braking system includes brakes on the front and rear wheels of a vehicle, and one of said auxiliary controllers transmits said selected signal to the brakes on the front wheels of the vehicle, and the other said controller transmits the selected signal to the rear wheel brakes.

10. Electronically controlled fluid pressure braking system as claimed in claim 9, wherein each of said auxiliary controllers communicates said selected signal to at least one axle controller, said axle controller controlling communication of fluid pressure to the corresponding brakes on the axle of the vehicle controlled by said axle controller to affect a brake pressure level in the said brakes in accordance with said selected signal.

11. Electronically controlled fluid pressure braking system as claimed in claim 2, wherein each of said auxiliary controllers communicates said selected signal to at least one axle controller, said axle controller controlling communication of fluid pressure to the corresponding brakes on the axle of the vehicle controlled by said axle controller to affect a brake pressure level in the said brakes in accordance with said selected signal.

12. Electronically controlled fluid pressure braking system for a combination vehicle having a towing portion and a towed portion, said towing portion having front and rear brakes and said towed portion having brakes, said system comprising operator responsive means for generating a pair of command signals representing an operator commanded braking level, a first auxiliary controller for controlling the front brakes of the vehicle, a second auxiliary controller controlling the rear brakes of the vehicle, a third auxiliary controller controlling the brakes on the trailer, and a master controller communicating with each of said first, second, and third auxiliary controllers, one of said command signals being transmitted to said first auxiliary controller and to said master controller, the other of said command signals being transmitted to said second auxiliary controller and to the master controller, said master controller including means for selecting one of said command signals and including means for generating a first pressure request signal as a function of the selected command signal, and means for transmitting said first pressure request signal to each of said auxiliary controllers, each of said auxiliary controllers being responsive to said pressure request signal for controlling the corresponding brakes controlled by each auxiliary controller.

13. Electronically controlled fluid pressure braking system as claimed in claim 12, wherein each of said first and second auxiliary controllers includes means for transmitting the command signal received by the corresponding one of said first and second auxiliary controllers to the other of said first and second auxiliary controllers.

14. Electronically controlled fluid pressure braking system as claimed in claim 13, wherein each of said first and second auxiliary controllers includes means for selecting between the command signals and for generating a second pressure request signal as a function of the selected signal, each of said first and second auxiliary controllers including means for selecting between said first and second request signals and for effecting a brake application as a function of the selected pressure request signal.

15. Electronically controlled fluid pressure braking system as claimed in claim 14, wherein said third auxiliary controller includes means for receiving said first pressure request signal, means for checking said first pressure request signal to determine if the magnitude of the first pressure request signal is within predetermined limits, and means for effecting a pressure level in the brakes of the towed unit corresponding to the value of said first pressure request signal if the value of the first pressure request signal is within said limits.

16. Electronically controlled fluid pressure braking system as claimed in claim 15, wherein said third auxiliary controller includes means for memorizing the value of said pressure request signal received from the master controller and for retaining said value in memory for at least one cycle of the auxiliary controller, means for selecting said memorized value if the value of the said first pressure request signal received from the master controller is not within said predetermined values, and means for indicating a failure if the value of the said second pressure request signal received from said master controller is outside of said predetermined limits for a predetermined time period.

17. Electronically controlled fluid pressure braking system as claimed in claim 12, wherein each of said first and second auxiliary controllers includes means for checking the value of said first pressure request signal received from said master controller to see if said first pressure request signals falls within normal limits, means for memorizing the value of said first pressure signal if it is within said normal limits, means for setting the value of said first pressure request signal equal to the memorized value if the value of the pressure request signal received from the master controller is not within said normal limits, and means for indicating a failure if the first pressure request signal falls outside of said normal limits for a predetermined time.

18. Fluid pressure braking system as claimed in claim 17, wherein said first and second auxiliary controllers include means for generating a second pressure request signal as a function of said command signals, and means for selecting said second pressure request signal upon indication of said failed condition.

19. Electronically controlled fluid pressure braking system as claimed in claim 12, wherein said operator responsive means includes a foot operated actuator for generating said command signals.

20. Electronically controlled fluid pressure braking system as claimed in claim 19, wherein said operator responsive means includes a hand operated control device which generates said pair of command signals.

21. Electronically controlled fluid pressure braking system as claimed in claim 20, wherein the command signals generated by the said foot operated actuator operates the brakes controlled by the first and second auxiliary controllers, and the brakes operated by said third auxiliary controller are operated by either of said foot operated actuator or hand operated control device.

22. Electronically controlled fluid pressure braking system as claimed in claim 21, wherein said master controller selects between the signals generated by the hand operated control device to generate a hand control signal and said master controller includes means for sorting the signals generated by said foot operated actuator to generate a foot control signal, said master controller further including means for selecting between said hand control signal and said foot control to transmit a pressure request signal to said third auxiliary controller equal to the greater of said hand control signal and said foot control signal.

* * * * *